(12) United States Patent
Kondo et al.

(10) Patent No.: US 9,321,645 B2
(45) Date of Patent: Apr. 26, 2016

(54) OZONE GENERATOR

(71) Applicant: NGK INSULATORS, LTD., Nagoya (JP)

(72) Inventors: Yoshimasa Kondo, Nagoya (JP); Shoji Yokoi, Nagoya (JP); Tatsuya Terazawa, Kasugai (JP); Naoya Takase, Konan (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/666,781

(22) Filed: Mar. 24, 2015

(65) Prior Publication Data
US 2015/0274526 A1 Oct. 1, 2015

(30) Foreign Application Priority Data
Mar. 31, 2014 (JP) .................................. 2014-074618

(51) Int. Cl.
*C01B 13/11* (2006.01)
(52) U.S. Cl.
CPC .................................... *C01B 13/115* (2013.01)
(58) Field of Classification Search
CPC .................................................. C01B 13/115
IPC ........................................ C01B 13/11, 2201/14
See application file for complete search history.

(56) References Cited

U.S. PATENT DOCUMENTS

| 5,413,769 A * | 5/1995 | Okazaki ................. B01J 19/088 |
| | | 422/186 |
| 5,483,117 A | 1/1996 | Rohrer |
| 2009/0178915 A1 | 7/2009 | Otaka et al. |
| 2012/0156106 A1* | 6/2012 | Murata ................... C01B 13/11 |
| | | 422/186.2 |

FOREIGN PATENT DOCUMENTS

| JP | 10-324504 A1 | 12/1998 |
| JP | 2013-060327 A1 | 4/2013 |

OTHER PUBLICATIONS

U.S. Appl. No. 14/666,748, filed Mar. 24, 2014, Konda, et al.
U.S. Office Action, U.S. Appl. No. 14/666,748, dated Dec. 31, 2015 (12 pages).

* cited by examiner

*Primary Examiner* — Kishor Mayekar
(74) *Attorney, Agent, or Firm* — Burr & Brown, PLLC

(57) ABSTRACT

An ozone generator includes a housing having an internal cavity and a plurality of electrode pairs located in the internal cavity. The electrode pairs each contain two electrodes arranged at a distance of a predetermined gap length, and a discharge space is formed between the two electrodes, whereby ozone is produced when a source gas flows at least between the two electrodes and a discharge is generated between the two electrodes. The ozone generator has a non-discharge portion in an arbitrary cross-section having a normal direction parallel to a main flow direction of the source gas in the internal cavity.

15 Claims, 13 Drawing Sheets

OZONE GENERATOR

CROSS-REFERENCE TO RELATED APPLICATION

This application is based upon and claims the benefit of priority from Japanese Patent Application No. 2014-074618 filed on Mar. 31, 2014, the contents of which are incorporated herein by reference.

BACKGROUND OF THE INVENTION

1. Field of the Invention

The present invention relates to an ozone generator for flowing a source gas between electrodes and generating a discharge between the electrodes, thereby producing ozone.

2. Description of the Related Art

An ozone generator is an apparatus capable of flowing an oxygen-containing gas such as air in a thermal non-equilibrium plasma to produce ozone. The thermal non-equilibrium plasma is generated utilizing a discharge provided by a discharge generating device. For example, the discharge generating device may be of a silent discharge type. For example, in this device, a high voltage of several to several tens kV is applied by a high-voltage alternating-current power source to a discharge gap between a high-voltage electrode and a ground electrode, to generate a discharge of an aggregate of micro-discharge columns. The oxygen-containing gas is decomposed by the discharge to produce ozone.

Conventional structures of such an ozone generator are disclosed, e.g., in Japanese Laid-Open Patent Publication Nos. 10-324504 and 2013-060327.

Japanese Laid-Open Patent Publication No. 10-324504 describes in paragraph [0002] that a silent discharge-type ozone generator has electrodes facing each other and one or two dielectric bodies interposed therebetween, a high alternating-current voltage is applied to the electrodes while flowing an oxygen-containing source gas (such as a high-concentration oxygen (PSA oxygen) gas or a dehumidified air) in a gap between the electrode and the dielectric body or in a gap between the dielectric bodies, and oxygen is dissociated by a silent discharge to produce ozone. The gap has a length of about 1 mm, and the dielectric body is made of a glass or ceramic material having a high dielectric strength.

Japanese Laid-Open Patent Publication No. 2013-060327 describes in paragraph [0008] that an ozone generator contains a discharge electrode, an induction electrode facing the discharge electrode, a dielectric body layer formed between the discharge electrode and the induction electrode, and a water-repellent layer formed on the discharge electrode.

SUMMARY OF THE INVENTION

However, the conventional ozone generators are disadvantageous in that the produced ozone is decomposed by a water molecule or an OH group (hydroxyl group), resulting in a lowered ozone production efficiency, in a high-humidity environment.

In Japanese Laid-Open Patent Publication No. 10-324504, the source gas flows between the two electrodes (an electrode pair) with the dielectric body interposed therebetween. As shown in FIGS. 4 and 5 of Japanese Laid-Open Patent Publication No. 10-324504, the electrode pair direction (the direction from one electrode to the other electrode) is perpendicular to (at an angle of 90°) the source gas flow direction. Therefore, the discharge surfaces of the electrodes are brought into direct contact with the humidified source gas, whereby the ozone production may be inhibited by the water or OH molecules, so that the ozone production efficiency may be reduced or the ozone production may be stopped.

In Japanese Laid-Open Patent Publication No. 2013-060327, the water-repellent layer is formed on the discharge electrode. However, as described in paragraph [0020] of Japanese Laid-Open Patent Publication. No. 2013-060327, the water-repellent layer may be peeled off during a long operation even when a protective film for preventing the peeling is formed between the dielectric body layer and the water-repellent layer. Furthermore, the ozone production efficiency is lowered with the operation time in a high-humidity environment disadvantageously.

In view of the above problems, an object of the present invention is to provide an ozone generator capable of reducing the changes in the ozone production even in a usage environment at high humidity, and stably producing ozone in a wide range of humidity environments (with an absolute humidity of 0 to 50 $g/m^3$).

[1] An ozone generator according to the present invention contains a housing having an internal cavity and a plurality of electrode pairs located in the internal cavity. The electrode pairs each contain two electrodes arranged at a distance of a predetermined gap length, and a discharge space is formed between the two electrodes, whereby ozone is produced when a source gas flows at least between the two electrodes of the electrode pair and a discharge is generated between the two electrodes. The electrode pairs are arranged in parallel, in series, or in parallel and series. The ozone generator has a non-discharge portion on an arbitrary cross-section having a normal direction parallel to a main flow direction of the source gas in the internal cavity.

In this ozone generator, the supplied amount of a humidified source gas is reduced between the two electrodes in the electrode pair, and the discharge space is hardly under a highly humidified condition. Therefore, ozone decomposition reactions with water or OH molecules can be suppressed, and the reduction of the ozone production amount can be decreased.

[2] In the present invention, a plurality of the electrode pairs may be arranged in series or in parallel and series. The term "the electrode pairs being arranged in series" means that the electrode pairs are arranged along a supply direction of the source gas supply direction. The term "the electrode pairs being arranged in parallel" means that the electrode pairs are arranged along the direction perpendicular to the supply direction of the source gas.

[3] In the present invention, in a case where a portion of the electrode pair including the discharge space is hypothetically cut by the cross-section, it is preferred that the ozone generator has an area ratio Ab/Aa of 20% or more. Aa represents an area of the cross-section, and Ab represents an area obtained by subtracting a projected area of the electrode pair and the discharge space in the cross-section from the area Aa of the cross-section.

In this case, the reduction of the ozone production amount due to the reduction of the source gas amount between the two electrodes in the electrode pair can be decreased. Furthermore, the amount of the humidified source gas is reduced between the two electrodes in the electrode pair, and the discharge space is hardly under a highly humidified condition. Consequently, the ozone decomposition reactions with the water or OH molecules can be suppressed, and the reduction of the ozone production amount can be decreased.

[4] In the present invention, in a case where a portion of the electrode pair with the discharge space is hypothetically cut by the cross-section, it is further preferred that the ozone generator has an area ratio Ab/Aa of 80% or more. Aa represents an area of the cross-section, and Ab represents an area obtained by subtracting a projected area of the electrode pair and the discharge space on the cross-section from the area Aa of the cross-section.

[5] In the present invention, it is preferred that 80% or more (by number) of the electrode pairs are arranged at a distance of 5 mm or more from a center line of the internal cavity.

[6] In the present invention, it is preferred that all of the electrode pairs are arranged at a distance of 5 mm or more from a center line of the internal cavity.

In the feature [5] or [6], the electrode pairs are not located in positions to which a large amount of the humidified source gas is introduced. Therefore, the amount of the humidified source gas in the discharge space can be reduced, the ozone decomposition reactions with the water or OH molecules can be suppressed, and the reduction of the ozone production amount can be decreased.

[7] In the present invention, it is preferred that 80% or more, by number, of the electrode pairs are arranged at a distance of 10 mm or more from a center line of the internal cavity.

[8] In the present invention, it is preferred that all of the electrode pairs are arranged at a distance of 10 mm or more from a center line of the internal cavity.

In the feature [7] or [8], the electrode pairs are not located in positions to which a large amount of the humidified source gas is introduced. Therefore, the amount of the humidified source gas in the discharge space can be reduced. Furthermore, one side of the discharge surfaces of the electrode pairs is not brought into direct contact with the source gas, whereby the surface of one dielectric body can be maintained in a low-humidity state even when the water or OH molecules are adsorbed to the surface. Thus, the reduction of the ozone production amount can be decreased.

[9] In the present invention, of the two electrodes, one electrode may be located on an upstream side of the source gas and another electrode may be located on a downstream side of the source gas, and a direction from the one electrode toward the other electrode may be inclined with respect to a supply direction of the source gas. In this case, one side of the discharge surfaces of the electrode pairs is not brought into direct contact with the source gas. Therefore, the surface of one dielectric body can be maintained in a low-humidity state even when the water or OH molecules are adsorbed to the surface. Thus, the reduction of the ozone production amount can be decreased.

[10] It is preferred that the angle between the direction from the one electrode toward the other electrode and the supply direction of the source gas has an absolute value of 80° or less. In this case, one side of the discharge surfaces of the electrode pairs is not brought into direct contact with the source gas. Therefore, the surface of one dielectric body can be maintained in a low-humidity state even when the water or OH molecules are adsorbed to the surface. Thus, the reduction of the ozone production amount can be decreased.

[11] It is preferred that an angle between the direction from the one electrode toward the other electrode and the supply direction of the source gas has an absolute value of 60° or less. In this case, the reduction of the source gas amount can be decreased between the two electrodes, one side of the electrode pair can be maintained in a low-humidity state, and the ozone production amount can be increased.

[12] It is preferred that an angle between the direction from the one electrode toward the other electrode and the supply direction of the source gas has an absolute value of 10° or more. In this case, the reduction of the ozone production amount, due to lack of the source gas between the one electrode and the other electrode (in the discharge space), can be decreased.

[13] It is preferred that an angle between the direction from the one electrode toward the other electrode and the supply direction of the source gas has an absolute value of 30° or more. In this case, the reduction of the source gas amount can be decreased between the two electrodes, one side of the electrode pair can be maintained in a low-humidity state, and the ozone production amount can be increased.

[14] In the present invention, the source gas may be an atmospheric air having an absolute humidity of 0 to 50 g/m$^3$.

[15] In the present invention, it is preferred that the gap length is at least 0.1 mm and less than 1.0 mm. In this case, the ozone generator can reduce the changes in the ozone production even in a usage environment at high humidity, and can stably act to produce ozone in a wide range of humidity environments (with an absolute humidity of 0 to 50 g/m$^3$).

[16] In the present invention, each of the electrodes may contain a tubular dielectric body having a hollow portion and a conductive body disposed in the hollow portion of the dielectric body.

The ozone generator of the present invention can reduce the changes in the ozone production even in a usage environment at high humidity and can stably act to produce ozone in a wide range of humidity environments (with an absolute humidity of 0 to 50 g/m$^3$).

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE INVENTION

An embodiment of the ozone generator of the present invention will be described below with reference to FIGS. 1 to 13. In this description, a numeric range of "A to B" includes both the numeric values A and B as the lower limit and upper limit values.

Figure 1:
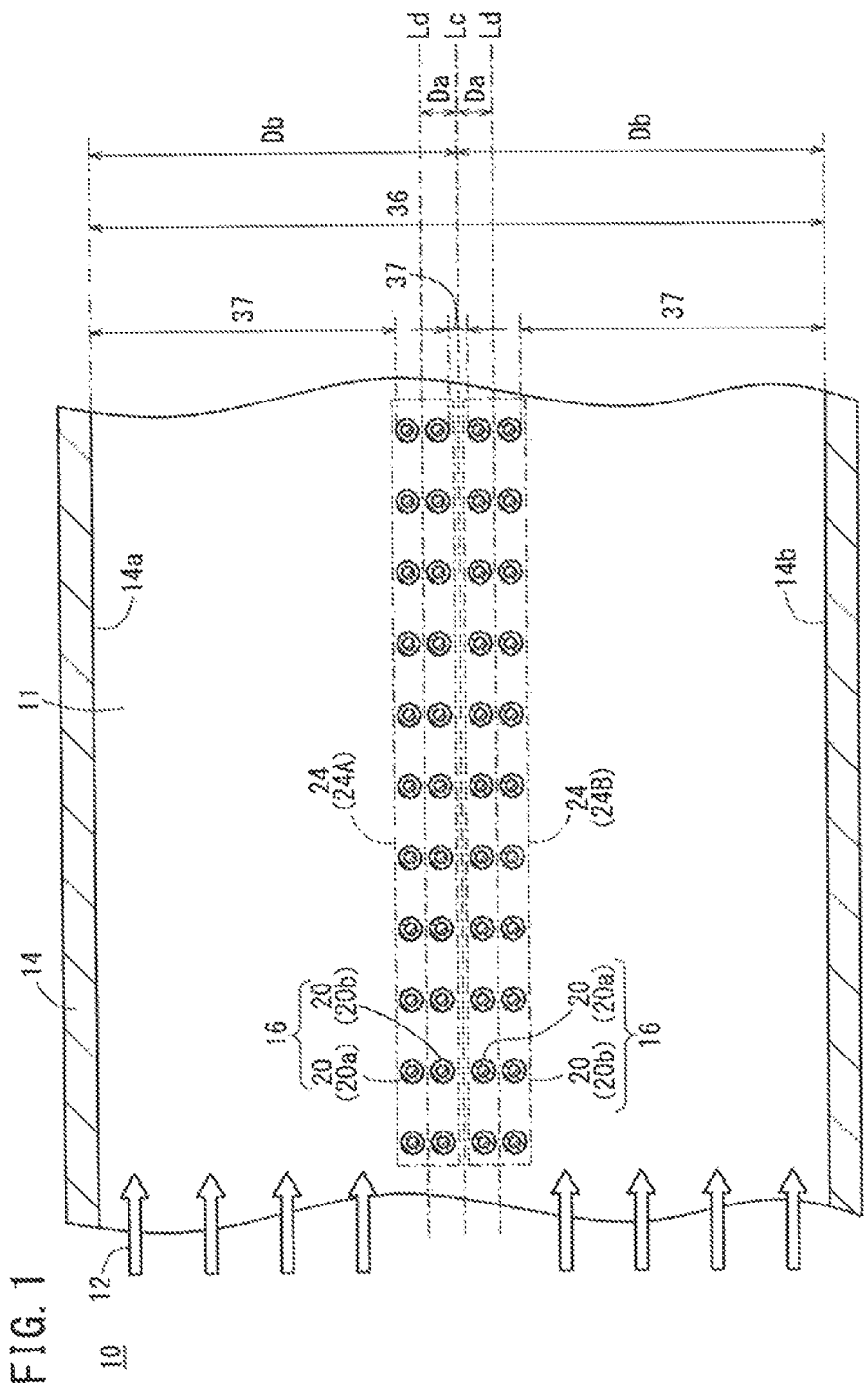
FIG. 1 is a longitudinal cross-sectional view of a principal part of an ozone generator according to an embodiment of the present invention.
Figure 2:
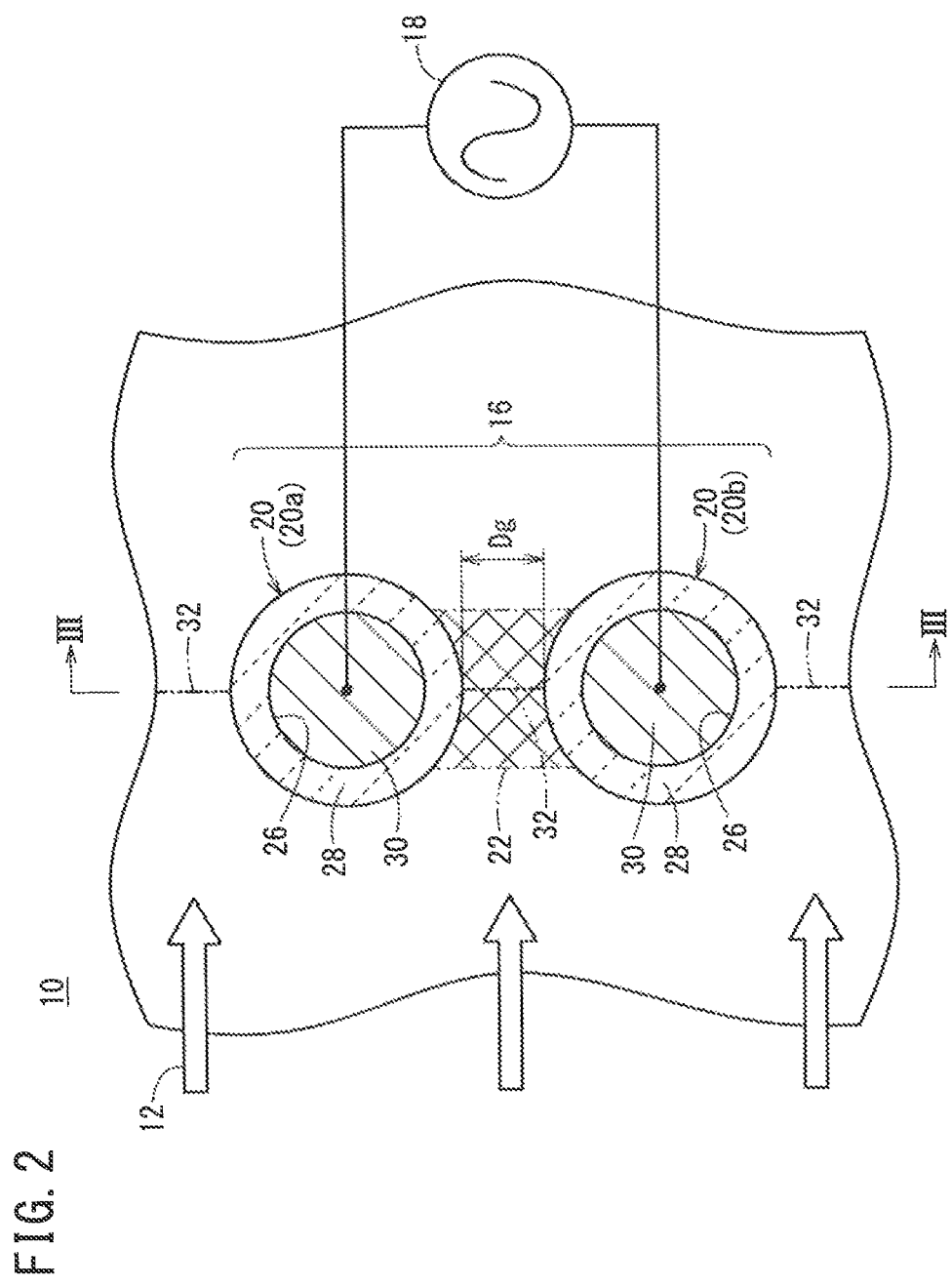
FIG. 2 is a longitudinal cross-sectional view of a structure of an electrode pair.
Figure 3:
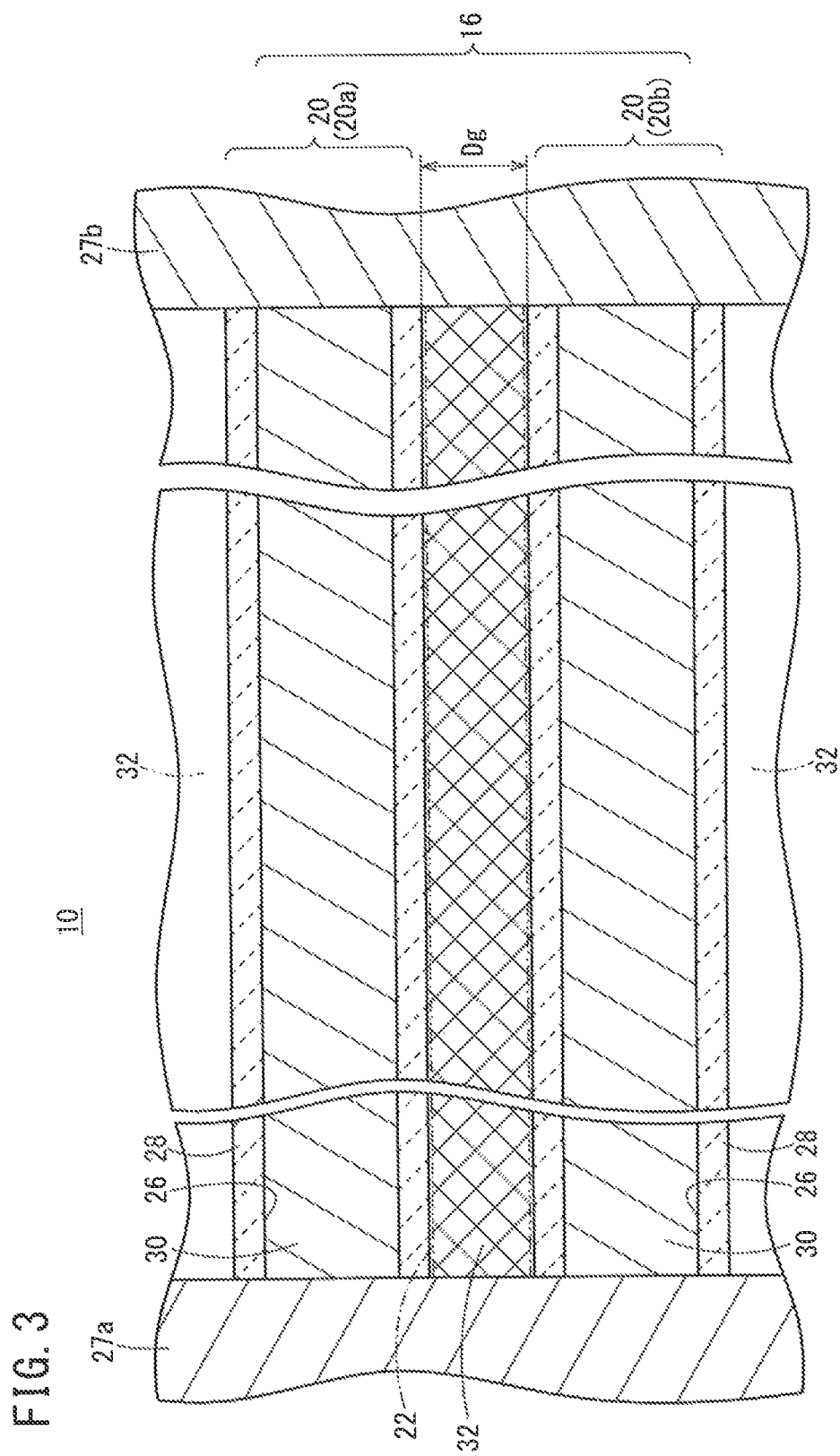
FIG. 3 is a cross-sectional view taken along the line of FIG. 2.

As shown in FIG. 1, an ozone generator 10 according to this embodiment includes a housing 14 having an internal cavity 11 to which a source gas 12 is supplied, one or more electrode pairs 16 disposed in the internal cavity 11 of the housing 14, and an alternating-current power source 18 (see FIG. 2). As shown in FIGS. 2 and 3, each of the electrode pairs 16 contains two electrodes 20 (a first electrode 20a and a second electrode 20b) arranged at a distance of a predetermined gap length Dg. The alternating-current power source 18 applies an alternating-current voltage between the two electrodes 20.

In the ozone generator 10, ozone is produced when the source gas 12 flows at least between the two electrodes 20 in the electrode pairs 16 and a discharge is generated between the two electrodes 20. A space formed between the two electrodes 20, in which the discharge is generated, is defined as the discharge space 22.

Specifically, in this embodiment, a plurality of the electrode pairs 16 are arranged in series and parallel between inner walls facing each other (one inner wall 14a and another inner wall 14b) in the housing 14. For example, a plurality of the electrode pairs 16 may be arranged in series in a supply direction of the source gas 12 to form an electrode pair column 24, and a plurality of the electrode pair columns 24 may be arranged in parallel in the direction perpendicular to the supply direction of the source gas 12. In the example of FIG. 1, two electrode pair columns 24 are arranged in parallel around the center line Lc of the internal cavity 11.

In this case, when Da represents the distance between the center line Lc of the internal cavity 11 and the center position Ld of the electrode pair column 24 and Db represents the distance between the center line Lc of the internal cavity 11 and the inner wall of the housing 14 (e.g., the one inner wall 14a). Da/Db is 10% or less. In FIG. 1, for example, the distance Da between the center line Lc of the internal cavity 11 and the center position Ld of the electrode pair column 24 is 5 mm or less. Of the two electrode pair columns 24, the electrode pair column 24 closer to the one inner wall 14a may be hereinafter referred to as a first electrode pair column 24A, and the electrode pair column 24 closer to the other inner wall 14b may be hereinafter referred to as a second electrode pair column 24B.

As shown in FIGS. 2 and 3, each of the electrodes 20 has a rod shape, extends along a source gas passage plane 32 having a normal direction parallel to the main flow direction of the source gas 12, and is formed between one side wall 27a and another side wall 27b of the housing 14. Thus, each of the electrodes 20 extends along the source gas passage plane 32 across the internal cavity 11 of the housing 14, and is fixed to the one side wall 27a and the other side wall 27b of the housing 14. The main flow direction of the source gas 12 is the flow direction which is oriented at the center of the source gas 12. Thus, the main flow direction is different from flow directions of non-oriented peripheral flow components of the source gas 12.

Each of the electrodes 20 contains a tubular dielectric body 28 having a hollow portion 26, and further contains a conductive body 30 disposed in the hollow portion 26 of the dielectric body 28. In the example of FIGS. 2 and 3, the dielectric body 28 has a cylindrical shape, and the hollow portion 26 formed therein has a circular sectional shape. The conductive body 30 has a circular sectional shape. Of course, the shapes of the components are not limited to the example. The dielectric body 28 may have a tubular shape with a polygonal section such as a triangular, quadrangular, pentangular, hexangular, or octangular section. The conductive body 30 may have a columnar shape with a polygonal section such as a triangular, quadrangular, pentangular, hexangular, or octangular section corresponding to the shape of the dielectric body 28.

In this embodiment, the source gas 12 is used for the purpose of producing ozone, and therefore may be an atmospheric air, an oxygen-containing gas, etc. In this case, the source gas 12 may be a non-dehumidified air.

The material of the conductive body 30 preferably contains a substance selected from the group consisting of molybdenum, tungsten, silver, copper, nickel, and alloys containing at least one thereof. Examples of such alloys include invar, kovar, inconel (registered trademark), and incoloy (registered trademark).

The material of the dielectric body 28 is preferably a ceramic material that can be fired at a temperature lower than the melting point of the conductive body 30. For example, the material is preferably a single-oxide, composite-oxide, or composite-nitride material containing one or more substances selected from the group consisting of barium oxide, bismuth oxide, titanium oxide, zinc oxide, neodymium oxide, titanium nitride, aluminum nitride, silicon nitride, alumina, silica, and mullite.

Figure 4:
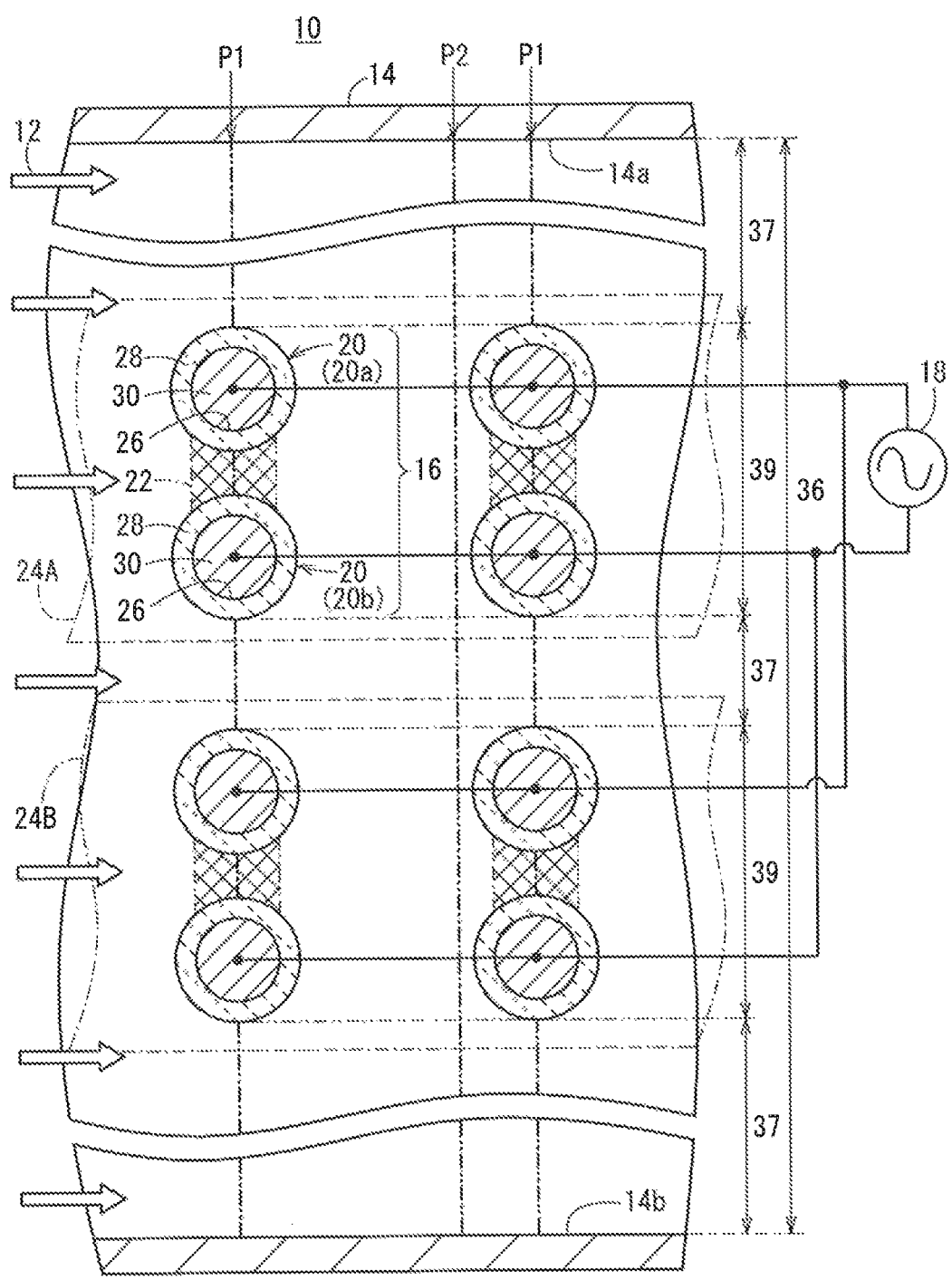
FIG. 4 is an enlarged longitudinal cross-sectional view of the principal part of the ozone generator according to the embodiment.

In this embodiment, as shown in FIG. 4, non-discharge portions 37 are formed on an arbitrary cross-section 36 having a normal direction parallel to the main flow direction of the source gas 12 in the internal cavity 11. In FIG. 4, the cross-sections 36 are shown in positions P1 (in which the electrode pairs 16 are disposed) and in a position P2 (in which the electrode pairs 16 are not disposed) as an example. In the position P1, portions of the electrode pairs 16 including the discharge spaces 22 are hypothetically cut or intersected by the cross-section 36.

In the position P1 where the electrode pairs 16 are disposed, portions 39 (which may be also referred to as portions which are deemed to be discharge spaces) are provided by projecting the electrode pairs 16 including the discharge spaces 22 onto the cross-section 36 at the position P1, and portions 37 are provided as non-discharge portions, which are portions other than the portions 39 in the cross-section 36.

For example, in the cross-section 36 at the position P1, an area Ab of the portions 37 (the non-discharge portions) other than the portions 39 (discharge portions) in the cross-section 36 is obtained by subtracting the projected area of the electrode pairs 16 (including the discharge spaces 22) on the cross-section 36 at the position P1 from the area Aa of the cross-section 36 at the position P1. The ratio (Ab/Aa) of the area Ab of the non-discharge portions 37 to the area Aa of the cross-section 36 is 20% or more, particularly 80% or more.

In the position P2 (in which the electrode pairs 16 are not disposed), the entire cross-section 36 is provided as the non-discharge portion 37. Thus, the ozone generator 10 has the non-discharge portions 37 in the cross-sections 36 in arbitrary positions. In other words, the non-discharge portion 37 is present in the cross-section 36 in any position.

For example, in the cross-section 36 at the position P2, the electrode pairs 16 including the discharge spaces 22 are not present in the cross-section 36. Therefore, the area Ab of the non-discharge portion 37 in the cross-section 36 is equal to the area Aa of the cross-section 36. Thus, the area ratio (Ab/Aa) is 100%.

In general, when all of the source gas 12 (such as a humidified source gas 12) introduced into the housing 14 flows between the two electrodes 20 in the electrode pairs 16, the ozone produced by the discharge is disadvantageously decomposed by water molecules or OH molecules in the source gas 12, resulting in a lowered ozone production efficiency.

In contrast, in this embodiment, since the non-discharge portions 37 are present in the cross-sections 36, the humidified source gas 12 is branched (flows in a split flow state) to the discharge spaces 22 between the two electrodes 20 in the electrode pairs 16 and to the non-discharge portions 37. Thus, not all of the humidified source gas 12 flows between the two electrodes 20, and the amount of the humidified source gas 12 between the two electrodes 20 is reduced. Consequently, the discharge spaces 22 are hardly under a highly humidified condition, whereby the ozone decomposition reactions with the water molecules or OH molecules can be suppressed, and the reduction of the ozone production amount can be decreased.

Furthermore, in this embodiment, as described above, the first electrode pair column 24A and the second electrode pair column 24B are arranged in parallel closer to the center line Lc of the internal cavity 11 (see FIG. 1). Therefore, the non-discharge portion 37 between each first electrode 20a in the first electrode pair column 24A and the one inner wall 14a of the housing 14, and the non-discharge portion 37 between each second electrode 20b in the second electrode pair column 24B and the other inner wall 14b of the housing 14 extend over a large area, respectively.

In addition, in this embodiment, as shown in FIG. 4, the area ratio (Ab/Aa) of the area Ab of the non-discharge portions 37 to the area Aa of the cross-section 36 having the normal direction parallel to the main flow direction of the source gas 12 in the internal cavity 11 of the housing 14 is 20% or more, particularly 80% or more.

Therefore, the amount of the source gas 12 between the two electrodes 20 in the electrode pairs 16 can be reduced, whereby the reduction of the ozone production amount can be minimized. Furthermore, the amount of the humidified source gas 12 can be reduced between the two electrodes 20 in the electrode pairs 16, and the discharge spaces 22 are hardly under a highly humidified condition, whereby the ozone decomposition reactions with the water molecules or OH molecules can be suppressed, and the reduction of the ozone production amount can be decreased.

Thus, in this embodiment, even when the supplied source gas 12 has a high humidity, the reduction of the ozone production amount due to the ozone decomposition reactions can be decreased, and the residual amount of the unreacted source gas 12 flowing through the discharge spaces 22, can be reduced. Consequently, the ozone generator 10 can exhibit a high ozone production efficiency.

As a result, the ozone generator can reduce the changes in the ozone production even at high humidity and can stably act to produce ozone in a wide range of humidity environments (with an absolute humidity of 0 to 50 $g/m^3$).

In addition, the water-repellent layer such as the one described in Japanese Laid-Open Patent Publication No. 2013-060327 is not used in the invention. Therefore, the ozone generator can exhibit a stable ozone production amount over a long period without peeling of the water-repellent layer during a long operation.

Several preferred modifications of the ozone generator 10 according to this embodiment will be described below.

The gap length Dg between the two electrodes 20 means the shortest distance between the dielectric body 28 in the first electrode 20a and the dielectric body 28 in the second electrode 20b. The gap length Dg is preferably at least 0.1 mm and less than 1.0 mm.

When the gap length Dg is excessively large, the distance between the dielectric bodies 28 is excessively increased, whereby the amount of the water or OH molecules is increased in the central portion of the discharge space 22. Therefore, in the high-humidity environment, the ozone production is inhibited, the ozone production efficiency is reduced, or the ozone production is stopped, by the water or OH molecules which are contained in the source gas 12 and remain around the dielectric bodies 28 or in the central portion of the discharge space 22.

When the gap length Dg is excessively small, the discharge space 22 may be short-circuited by the water or OH molecules adsorbed to the dielectric bodies 28. Thus, the dielectric bodies 28 may be connected by the water or OH molecules. In this case, the ozone production is inhibited, the ozone production efficiency is reduced, or the ozone production is stopped, by the water or OH molecules, as in the case where a large amount of the water or OH molecules remain in the central portion of the discharge space 22.

Consequently, the gap length Dg is preferably at least 0.1 mm and less than 1.0 mm.

In this embodiment, each electrode 20 contains the tubular dielectric body 28 having the hollow portion 26 and the conductive body 30 disposed in the hollow portion 26 of the dielectric body 28. Therefore, the distance between the electrodes 20 can be easily controlled. Thus, the gap length Dg between the electrodes 20 can be more easily controlled within the range of at least 0.1 mm and less than 1.0 mm as compared with the creeping discharge-type structure described in Japanese Laid-Open Patent Publication No, 10-324504.

In the ozone generator 10 of this embodiment, the flow volume of the source gas 12 is preferably 380 L/min or less in the discharge space 22 (per one discharge space 22). The flow volume is more preferably 300 L/min or less, further preferably 150 L/min or less.

In this case, the distribution of the source gas 12 in the discharge space 22 can be reduced, the ozone molecules can be uniformly produced in the discharge space 22, and the source gas 12 can be used up for the ozone production, so that insufficient production of the ozone molecules due to too much source gas 12 can be avoided. Therefore, the reduction of the ozone production amount due to the ozone decomposition can be decreased, and the residual amount of the unreacted source gas 12 flowing through the discharge space 22 can be reduced. Consequently, the ozone generator 10 can exhibit a high ozone production efficiency.

The electrode 20 may be produced by the following method. Thus, for example, a tubular compact or green body is preliminarily fired to prepare a preliminarily fired body having a hollow portion, and the conductive body 30 is inserted into the hollow portion of the preliminarily fired body. Then, the preliminarily fired body and the conductive body 30 are fired to be directly integrated with each other at a temperature higher than the preliminary firing temperature, whereby the electrode 20 containing the dielectric body 28 having the hollow portion 26 and the conductive body 30 inserted into the hollow portion 26 is produced.

Alternatively, the electrode 20 may be produced by a gel casting method. In the gel casting method, the conductive body 30 is placed in a mold, a slurry containing a ceramic powder, a dispersion medium, and a gelling agent is cast into the mold, the slurry is gelled, solidified, and molded by changing the temperature or by adding a cross-linker, and the resultant is fired to produce the electrode 20.

Several modification examples (first to third modification examples) of the ozone generator 10 of this embodiment will be described below with reference to FIGS. 5 to 11.

Figure 5:
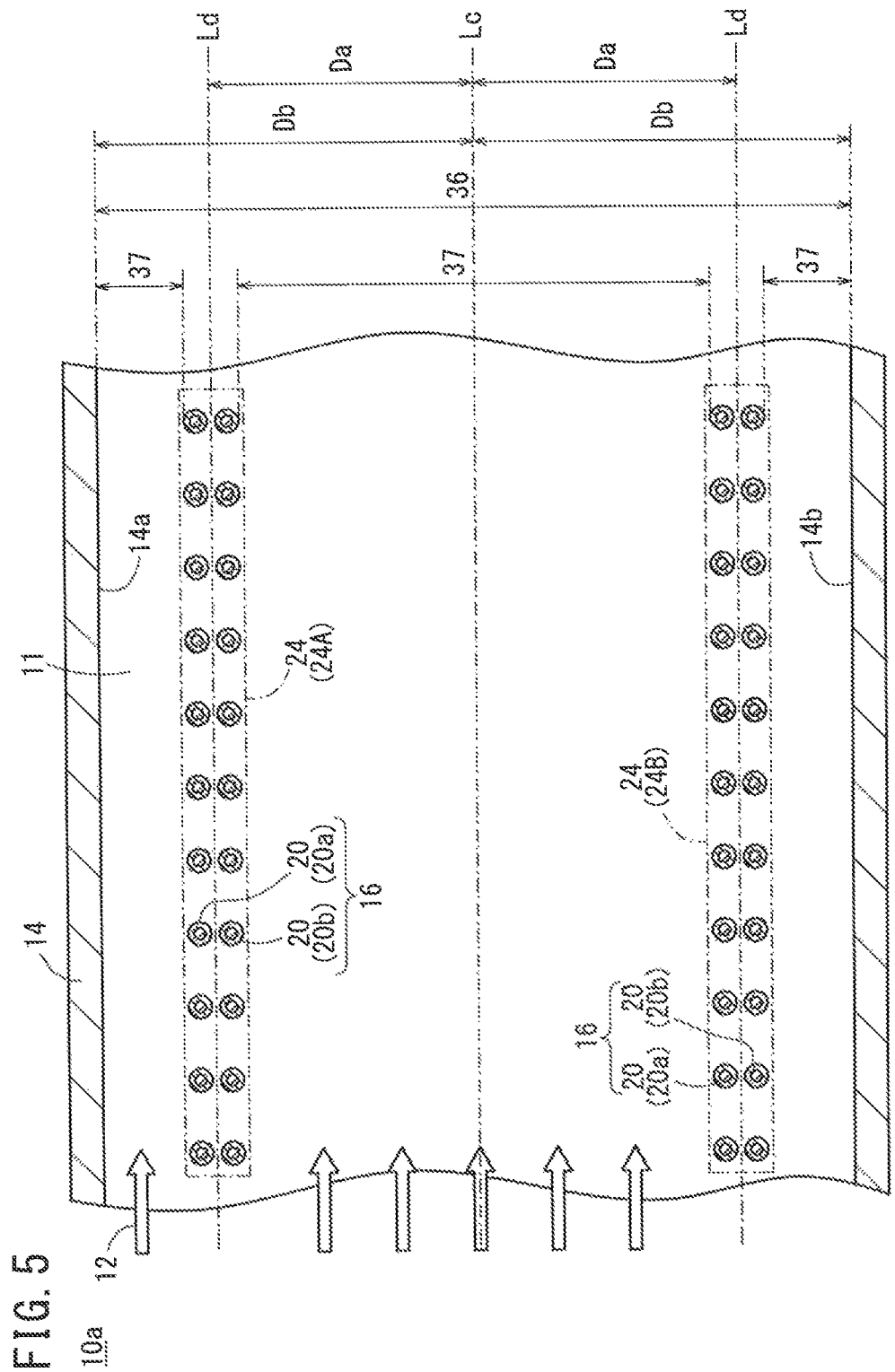
FIG. 5 is a longitudinal cross-sectional view of a principal part of an ozone generator according to a first modification example.
Figure 6:
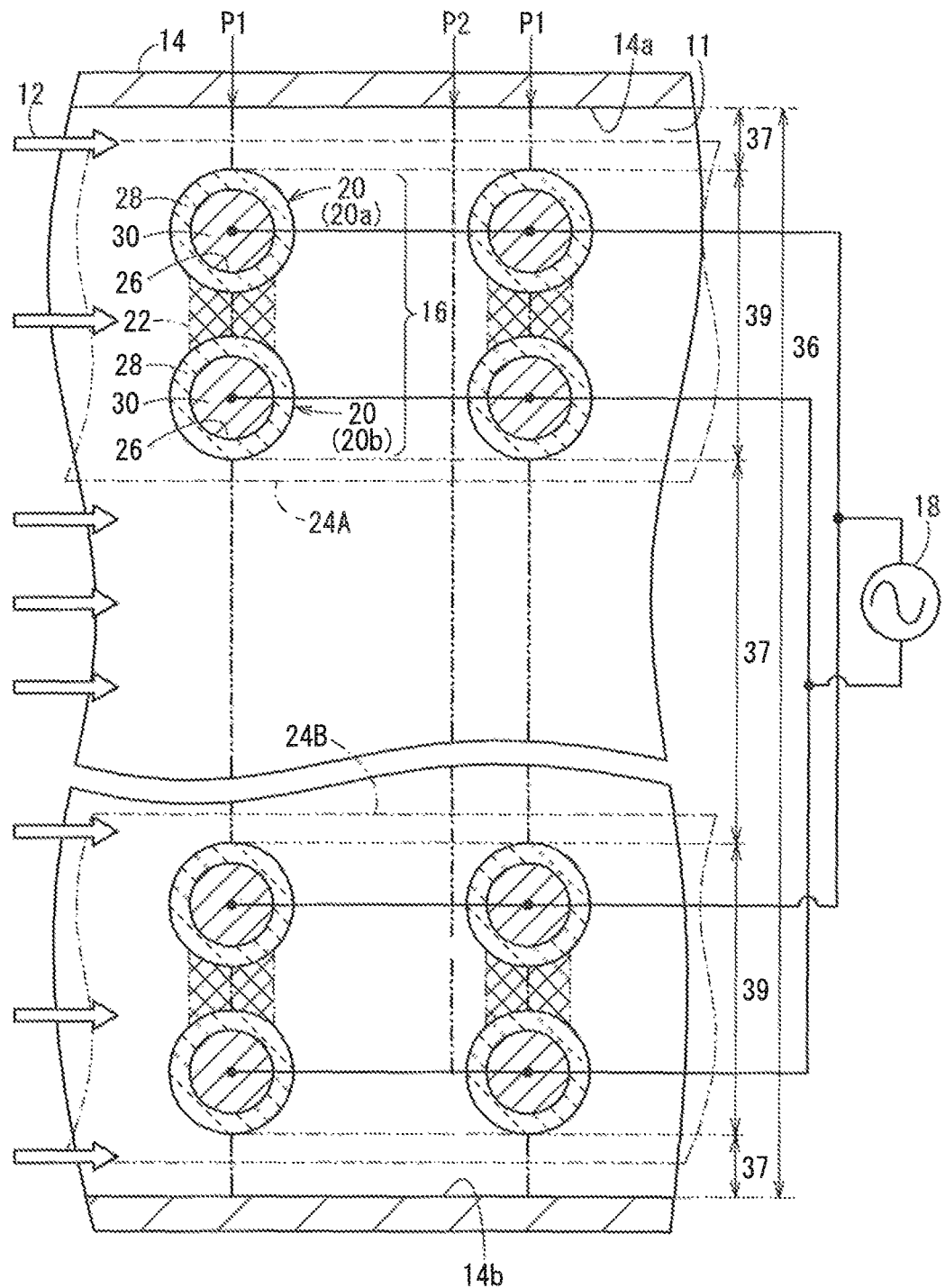
FIG. 6 is an enlarged longitudinal cross-sectional view of the principal part of the ozone generator according to the first modification example.

As shown in FIG. 5, an ozone generator 10a according to the first modification example is different from the ozone generator 10 in that the first electrode pair column 24A and the second electrode pair column 24B are arranged in parallel at a large distance from the center line Lc of the internal cavity 11. In this case, the ratio (Da/Db) of the distance Da between the center line Lc of the internal cavity 11 and the center position Ld of the electrode pair column 24 to the distance Db between the center line be of the internal cavity 11 and the inner wall of the housing 14 (e.g., the one inner wall 14a) is 10% or more. In FIG. 5, for example, the distance Da between the center line Lc of the internal cavity 11 and the center position Ld of the electrode pair column 24 is 5 mm or more.

Therefore, as shown in FIG. 5, the non-discharge portion 37 having a large area is formed including the center line be of the internal cavity 11 between each second electrode 20b in the first electrode pair column 24A and each first electrode 20a in the second electrode pair column 24W.

In general, when the source gas 12 flows in a pipe line such as the internal cavity 11 of the housing 14, the source gas 12 exhibits a parabolic flow rate distribution having the maximum value around the center. In the first modification example, because of the above structure, the electrode pairs 16 are not located in positions to which a large amount of the humidified source gas 12 is introduced. Therefore, the amount of the humidified source gas 12 in the discharge space 22 can be reduced, the ozone decomposition reactions with the water or OH molecules can be suppressed, and the reduction of the ozone production amount can be decreased.

In the above example, all of the electrode pairs 16 are arranged at a distance of 5 mm or more outside from the center line be of the internal cavity 11. Alternatively, 80% or more (by number) of the electrode pairs 16 may be arranged at a distance of 5 mm or more from the center line Lc of the internal cavity 11.

The ratio (Da/Db) of the distance Da between the center line Lc of the internal cavity 11 and the center position Ld of the electrode pair column 24 to the distance Db between the center line Lc of the internal cavity 11 and the inner wall of the housing 14 is preferably 20% or more. For example, the distance Da between the center line Lc of the internal cavity 11 and the center position Ld of the electrode pair column 24 is preferably 10 mm or more. Also in this case, 80% or more (by number) of the electrode pairs 16 may be arranged at a distance of 10 mm or more outside from the center line Lc of the internal cavity 11.

In this example, of the first electrodes 20a and the second electrodes 20b in the electrode pairs 16 in the first electrode pair column 24A, the discharge surfaces of the first electrodes 20a, disposed closer to the one inner wall 14a of the housing 14, are hard to be brought into direct contact with the source gas 12. On the other hand, in the second electrode pair column 24B, the discharge surfaces of the second electrodes 20b, disposed closer to the other inner wall 14b of the housing 14, are hard to be brought into direct contact with the source gas 12. Therefore, the surfaces of the dielectric bodies 28 in the first electrodes 20a and the second electrodes 20b can be maintained in the low-humidity state even when the water or OH molecules are adsorbed to the surfaces. Thus, the reduction of the ozone production amount can be decreased. Though it is not necessary to arrange all the electrode pairs 16 in series, it is preferable to arrange all the electrode pairs 16 in series as shown in FIGS. 1 and 5.

Figure 7:
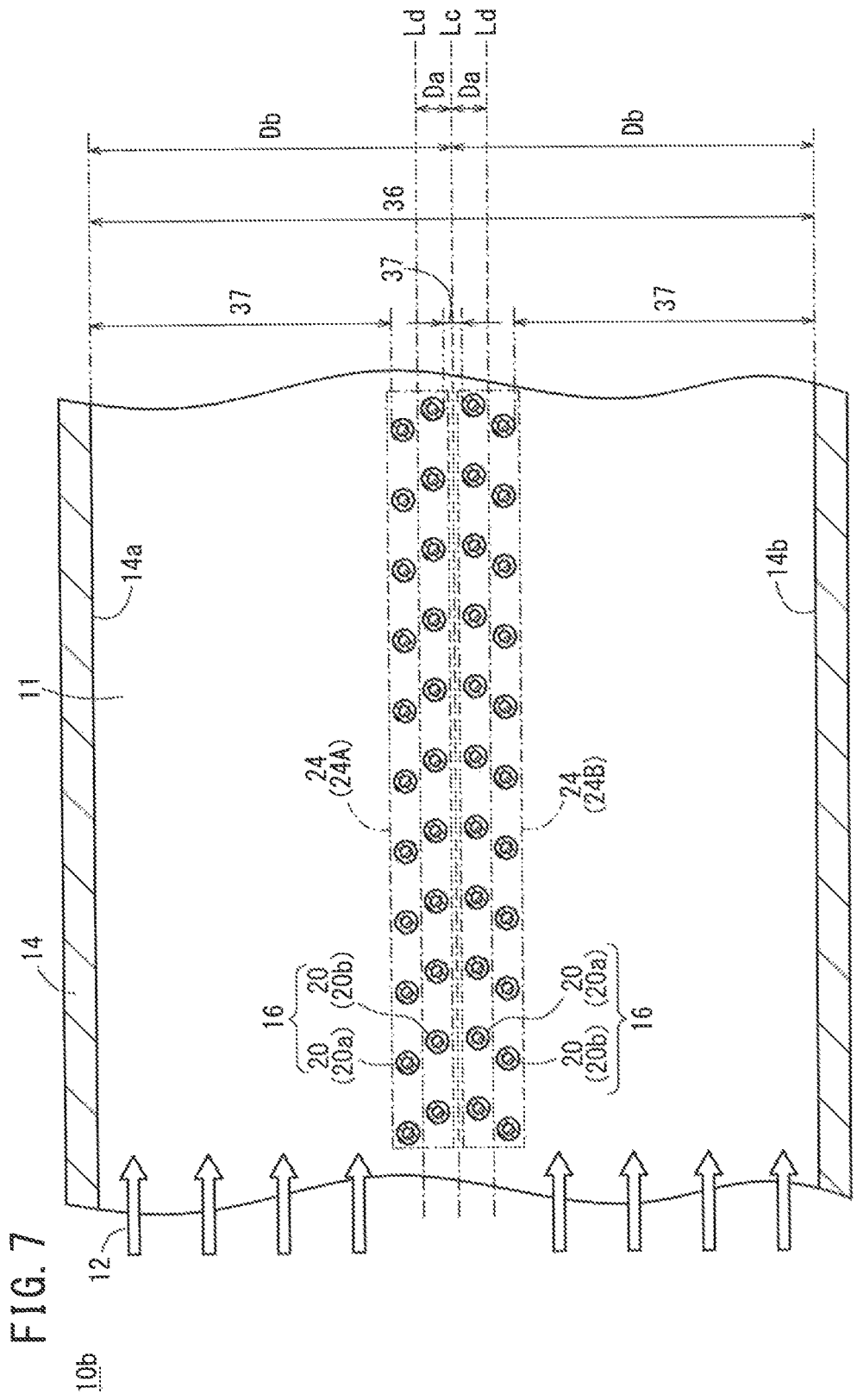
FIG. 7 is a longitudinal cross-sectional view of a principal part of an ozone generator according to a second modification example.
Figure 8A:
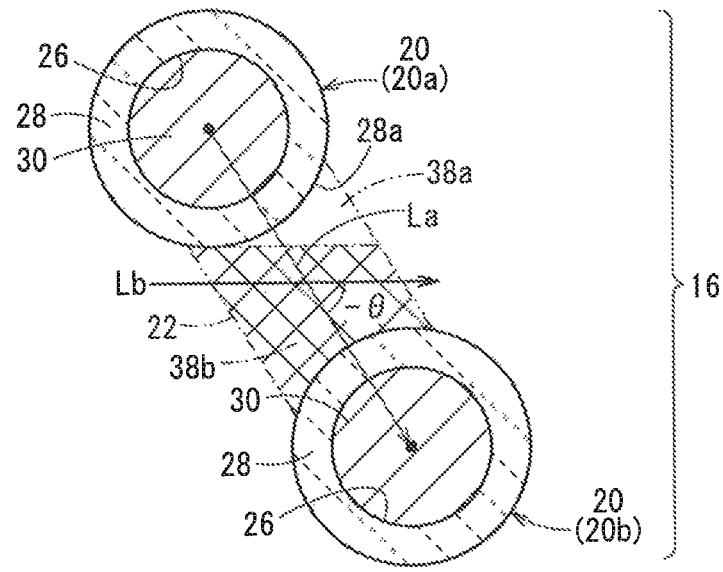
FIG. 8A is an explanatory view for illustrating an operation of an electrode pair inclined in one direction.
Figure 8B:
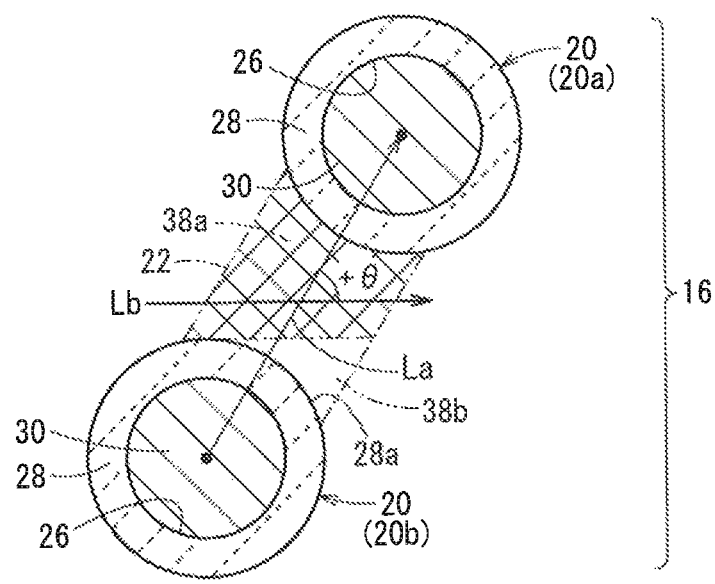
FIG. 8B is an explanatory view for illustrating an operation of an electrode pair inclined in another direction.

As shown in FIGS. 7, 8A, and 8B, an ozone generator 10b according to the second modification example is approximately equal to the ozone generator 10 of the above embodiment, and is different from the ozone generator 10 as follows.

As shown in FIG. 8A, of the two electrodes 20 in each electrode pair 16 in the first electrode pair column 24A, the first electrode 20a is located on an upstream side of the source gas 12, and the second electrode 20b is located on a downstream side of the source gas 12. Furthermore, the direction La from the upstream first electrode 20a toward the downstream second electrode 20b is inclined with respect to a supply direction Lb of the source gas 12. Similarly, as shown in FIG. 8B, of the two electrodes 20 in each electrode pair 16 in the second electrode pair column 24B, the second electrode 20b is located on the upstream side of the source gas 12, and the first electrode 20a is located on the downstream side of the source gas 12. Furthermore, the direction La from the upstream second electrode 20b toward the downstream first electrode 20a is inclined with respect to the supply direction Lb of the source gas 12.

Therefore, as shown in FIG. 8A, in the first electrode pair column 24A, a region 38b in which the source gas 12 flows and a region 38a in which the source gas 12 hardly flows are formed in the discharge space 22 between the first electrode 20a and the second electrode 20b. Thus, on the surface of the dielectric body 28 in the first electrode 20a, a surface in the discharge space 22 (a discharge surface 28a) is not brought into direct contact with the source gas 12. Consequently, the discharge surface 28a of the dielectric body 28 in the first electrode 20a is not brought into direct contact with the water or OH molecules and thereby can be maintained in the low-humidity state, so that the reduction of the ozone production amount can be decreased.

Similarly, as shown in FIG. 8B, in the second electrode pair column 24B, a discharge surface 28a of the dielectric body 28 in the second electrode 20b is not brought into direct contact with the source gas 12. Consequently, the discharge surface 28a of the dielectric body 28 in the second electrode 20b is not brought into direct contact with the water or OH molecules and thereby can be maintained in the low-humidity state, so that the reduction of the ozone production amount can be decreased.

Specifically, it is preferred that the angle ($\pm\theta$) between the direction from the upstream electrode (the first electrode 20a or the second electrode 20b) toward the downstream electrode (the second electrode 20b or the first electrode 20a) (hereinafter referred to as the electrode pair direction La) and the supply direction Lb of the source gas 12 has an absolute value of 80° or less. The angle is $-\theta$ in FIG. 8A and is $+\theta$ in FIG. 8B. In this case, one of the discharge surfaces 28a in each electrode pairs 16 is not brought into direct contact with the source gas 12. Consequently, one of the discharge surfaces 28a is not brought into direct contact with the water or OH molecules and thereby can be maintained in the low-humidity state, so that the reduction of the ozone production amount can be decreased.

It is preferred that the angle ($\pm\theta$) between the direction La of the electrode pair 16 and the supply direction Lb of the source gas 12 has an absolute value of 10° or more. In this case, the reduction of the ozone production amount, due to lack of the source gas 12 in the discharge space 22 between the first electrode 20a and the second electrode 20b, can be decreased.

It is preferred that the angle (±θ) between the direction La of the electrode pair 16 and the supply direction Lb of the source gas 12 has an absolute value of 60° or less. It is preferred that the angle (±θ) between the direction La of the electrode pair 16 and the supply direction Lb of the source gas 12 has an absolute value of 30° or more. In this case, the reduction of the supply amount of the source gas 12 can be decreased between the two electrodes 20, one of the electrodes 20 in the electrode pair 16 can be maintained in the low-humidity state, and a large ozone production amount can be achieved.

Figure 9:
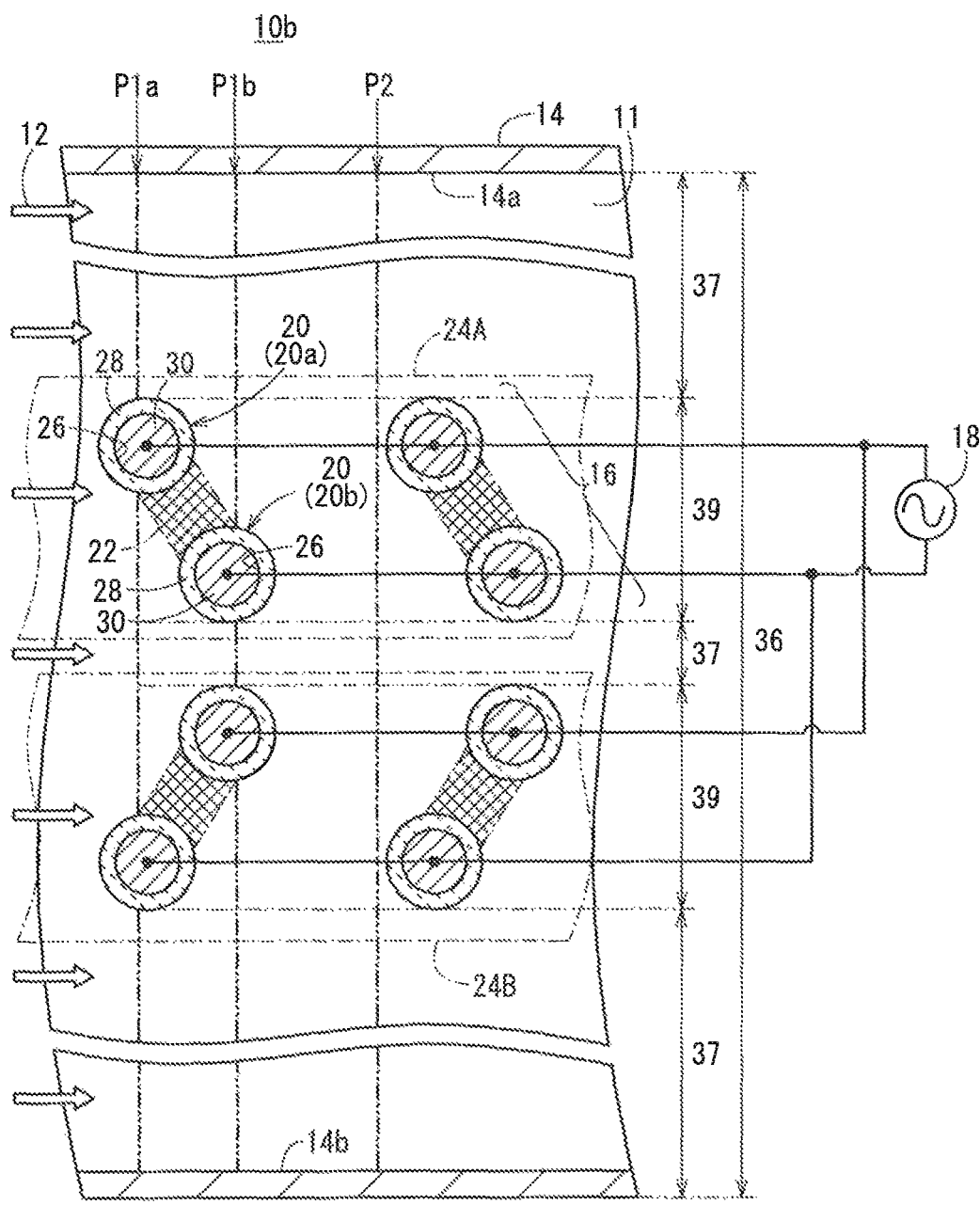
FIG. 9 is an enlarged longitudinal cross-sectional view of the principal part of the ozone generator according to the second modification example.

Of course, as shown in FIG. 9, also in the ozone generator 10b of the second modification example, the non-discharge portions 37 are formed in the cross-sections 36 having a normal direction parallel to the main flow direction of the source gas 12 in the internal cavity 11. In FIG. 9, the cross-sections 36 are shown in positions P1a and P1b (in which the electrode pairs 16 are disposed) and in a position P2 (in which the electrode pairs 16 are not disposed) as an example. In the positions P1a and P1b, portions of the electrode pairs 16 including the discharge spaces 22 are hypothetically cut by the cross-section 36.

In the position P1a in which the electrode pairs 16 are disposed, portions 39 (which may be also referred to as portions 39 which are deemed to be discharge spaces) are provided by projecting the electrode pairs 16 including the discharge spaces 22 onto the cross-section 36 at the position P1a, and portions 37 are provided as the non-discharge portions which are portions other than the portions 39 in the cross-section 36. Similarly, in the position P1b in which the electrode pairs 16 are disposed, portions 39 are provided by projecting the electrode pairs 16 including the discharge spaces 22 onto the cross-section 36, and portions 37 are provided as the non-discharge portions, which are portions other than the portions 39 in the cross-section 36.

For example, in the position P1a, the area Ab of the non-discharge portions 37 in the cross-section 36 is obtained by subtracting the projected area of the electrode pairs 16 (including the discharge spaces 22) on the cross-section 36 at the position P1a from the area Aa of the cross-section 36 at the position P1a. Similarly, in the position P1b, the area Ab of the non-discharge portions 37 in the cross-section 36 is obtained by subtracting the projected area of the electrode pairs 16 (including the discharge spaces 22) on the cross-section 36 at the position P1b from the area Aa of the cross-section 36 at the position P1b. The ratio (Ab/Aa) of the area Ab of the non-discharge portions 37 to the area Aa of the cross-section 36 is 20% or more, particularly 80% or more.

In the position P2 (in which the electrode pairs 16 are not disposed), the entire cross-section 36 corresponds to the non-discharge portion 37. Thus, the ozone generator 10b has the non-discharge portions 37 in the cross-sections 36 in arbitrary positions. In other words, the non-discharge portion 37 is present in the cross-section 36 in any position.

For example, in the position P2, the electrode pairs 16 including the discharge spaces 22 are not present in the cross-section 36. Therefore, the area Ab of the non-discharge portion 37 in the cross-section 36 is equal to the area Aa of the cross-section 36. Thus, the area ratio (Ab/Aa) is 100%.

As described above, the area ratio (Ab/Aa) of the area Ab of the non-discharge portions 37 to the area Aa of the cross-section 36 having the normal direction parallel to the main flow direction of the source gas 12 in the internal cavity 11 of the housing 14 is 20% or more, particularly 80% or more. Furthermore, as shown in FIG. 7, the first electrode pair column 24A and the second electrode pair column 24B are arranged in parallel closer to the center line Lc of the internal cavity 11. Therefore, the amount of the source gas 12 can be reduced between the two electrodes 20 in the electrode pairs 16, whereby the reduction of the ozone production amount can be minimized.

Though the electrode pairs 16 in the first electrode pair column 24A extend in the same direction La and at the same angle in the second modification example, some of the electrode pairs 16 may extend in a different direction or at a different angle. Also, the electrode pairs 16 in the second electrode pair column 24 may be modified in this manner.

Figure 10:
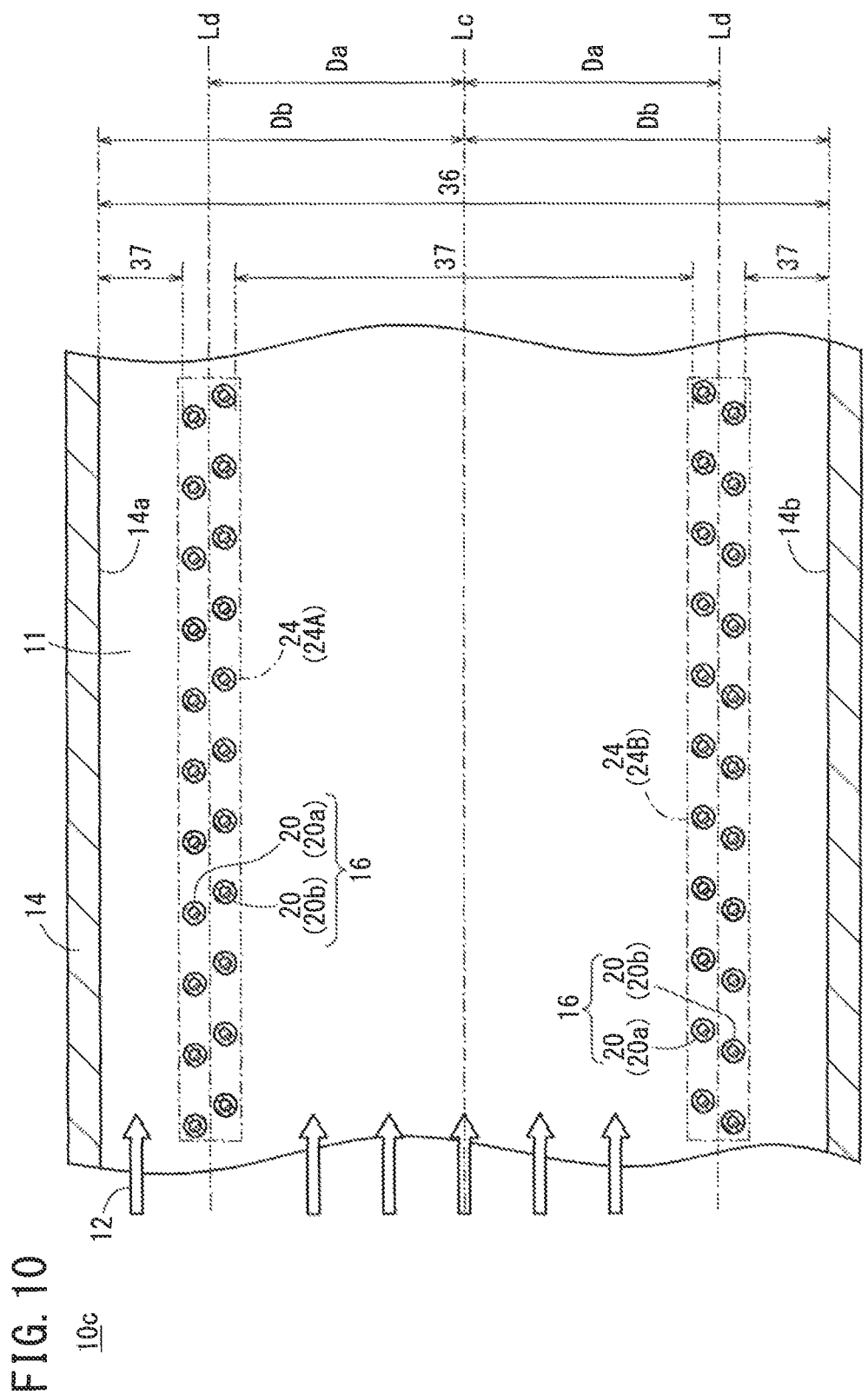
FIG. 10 is a longitudinal cross-sectional view of a principal part of an ozone generator according to a third modification example.
Figure 11:
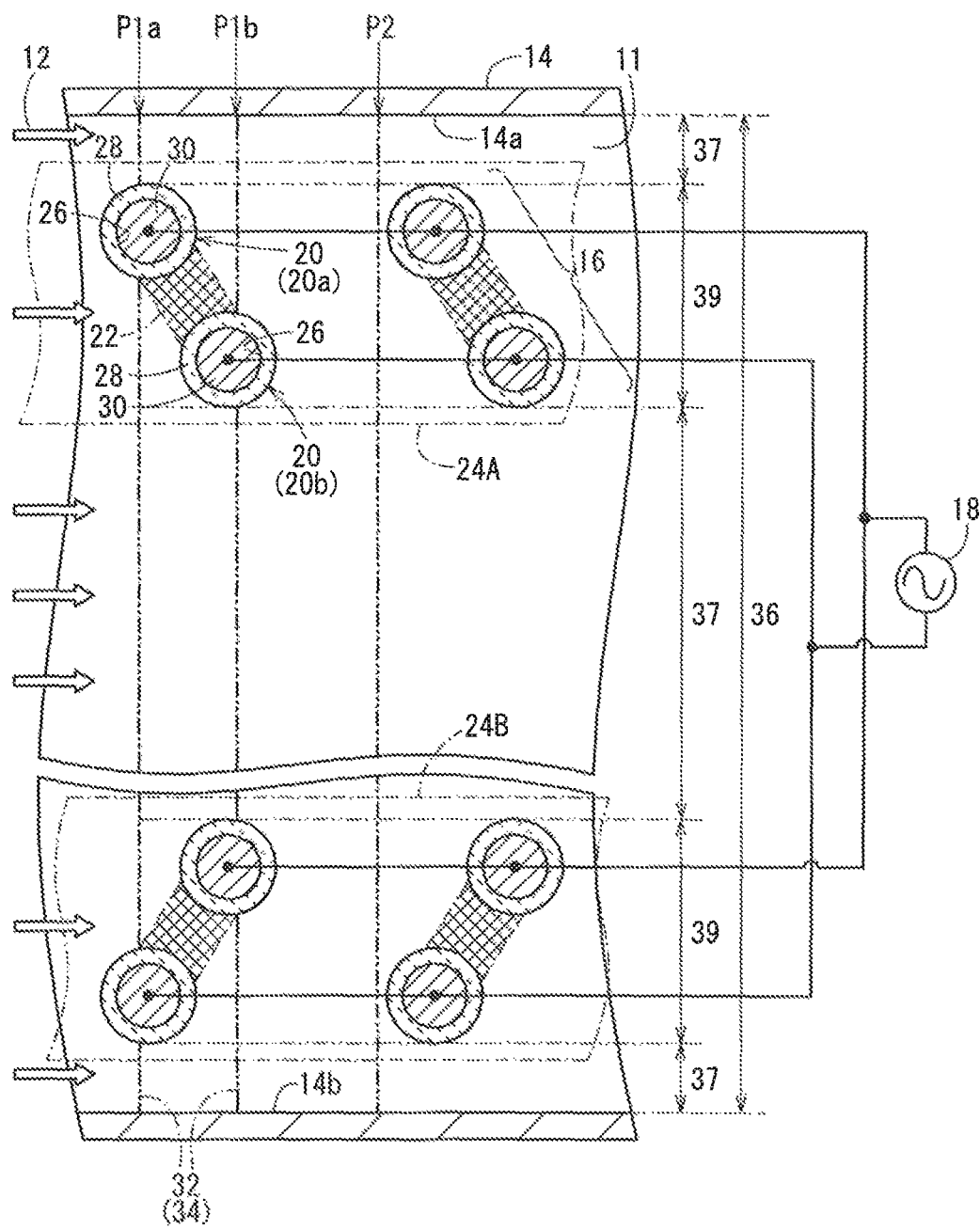
FIG. 11 is an enlarged longitudinal cross-sectional view of the principal part of the ozone generator according to the third modification example.

As shown in FIGS. 10 and 11, an ozone generator 10c according to the third modification example is approximately equal to the ozone generator 10b of the second modification example, and is different from the ozone generator 10b in that the first electrode pair column 24A and the second electrode pair column 24B are arranged in parallel at a large distance from the center line Lc of the internal cavity 11. The ozone generator 10c of the third modification example, as with the ozone generator 10b of the second modification example, has the advantageous effect caused by inclining the direction La of the electrode pair 16 with respect to the supply direction Lb of the source gas 12. Thus, in the third modification example, the low-humidity state can be maintained, and the reduction of the ozone production amount can be decreased.

Furthermore, as shown in FIG. 10, the ratio (Da/Db) of the distance Da between the center line Lc of the internal cavity 11 and the center position Ld of the electrode pair column 24 to the distance Db between the center line Lc of the internal cavity 11 and the inner wall of the housing 14 (e.g., the one inner wall 14a) is 10% or more, preferably 20% or more. For example, the distance Da between the center line Lc of the internal cavity 11 and the center position Ld of the electrode pair column 24 is 5 mm or more, preferably 10 mm or more. Therefore, the electrode pairs 16 are not located in positions to which a large amount of the humidified source gas 12 is introduced. Consequently, the amount of the humidified source gas 12 in the discharge space 22 can be reduced, the ozone decomposition reactions with the water or OH molecules can be suppressed, and the reduction of the ozone production amount can be decreased.

Though the electrode pairs 16 in the first electrode pair column 24A extend in the same direction La and at the same angle in the third modification example, some of the electrode pairs 16 may extend in a different direction from the direction La or at a different angle. Also, the electrode pairs 16 in the second electrode pair column 24B may be modified in this manner.

First Example

Changes in ozone production amount in samples 1 to 5 were evaluated under various supply flow rates of a source gas. In the samples, the dielectric body 28 was made of alumina and the conductive body 30 was made of copper in each electrode 20.

(Method for Measuring Ozone Production Amount)

In the measurement of the ozone production amount, an air (having an absolute humidity of 30 g/m$^3$) was used as the source gas 12 under a gas pressure of 0.10 MPa.

The alternating-current power source 18 was used as a discharge power source for applying an alternating-current voltage with a voltage (amplitude A) of ±4 kV and a frequency f of 20 kHz.

The ozone concentration in the exhaust gas was measured using an ozone concentration meter EG-3000D (available from Ebara Jitsugyo Co., Ltd.) under the above conditions. The ozone production amount was obtained by multiplying the measured value by a supply flow rate.

The details of electrode structures in ozone generators of the samples 1 to 5 were as follows.

(Sample 1)

In the sample 1, the numbers of the first electrode pair column 24A and the second electrode pair column 24B were increased in the ozone generator 10 shown in FIG. 1, so that the area ratio (Ab/Aa) of the area Ab of the non-discharge portions 37 to the area Aa of the cross-section 36 having the normal direction parallel to the main flow direction of the source gas 12 in the internal cavity 11 of the housing 14 was 0%. Thus, the sample 1 had no non-discharge portions 37. The distance Da between the center line Lc of the internal cavity 11 and the center position Ld of the electrode pair column 24 disposed closest to the center line Lc was 1 mm.

(Samples 2 to 4)

In the samples 2, 3, and 4, the numbers of the first electrode pair column 24A and the second electrode pair column 24B were increased in the ozone generator 10 shown in FIG. 1, so that the area ratio (Ab/Aa) was controlled at 20%, 40%, and 60%, respectively.

(Sample 5)

The sample 5 had the same structure as the ozone generator 10 shown in FIG. 1. Thus, the sample 5 had one first electrode pair column 24A and one second electrode pair column 24B, and the area ratio (Ab/Aa) was 80%.

(Evaluation Result)

Figure 12:
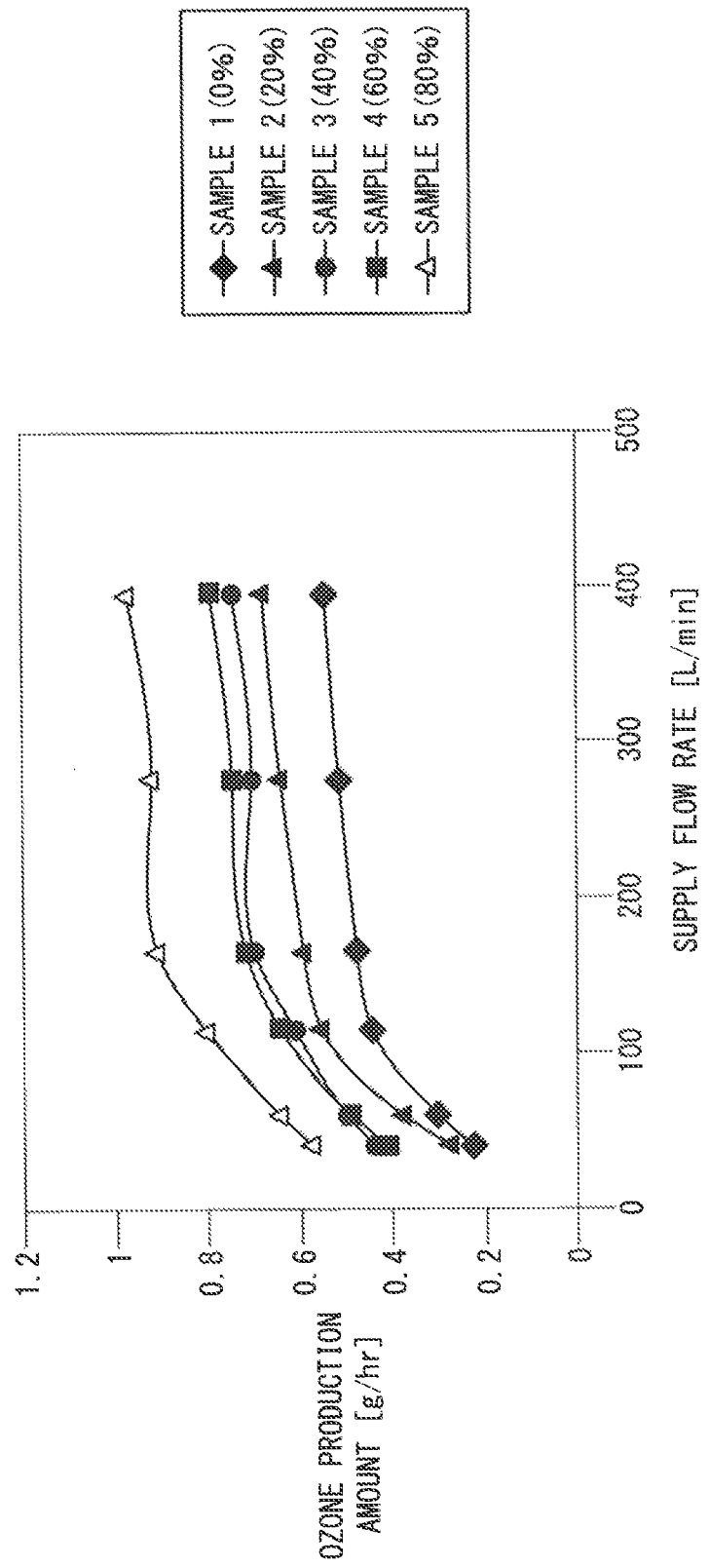
FIG. 12 is a graph showing the ozone production amount changes under various supply flow rates of a source gas in samples 1 to 5.

The evaluation results of the samples 1 to 5 are shown in FIG. 12.

As is clear from FIG. 12, as the area ratio (Ab/Aa) increases, the ozone production amount tends to increase. Thus, the area ratio (Ab/Aa) is preferably 20% or more, more preferably 40% or more, particularly preferably 80% or more.

Second Example

Ozone production amount changes of samples 6 to 9 were evaluated under various supply flow rates of a source gas. The ozone production amounts were obtained in the same manner as First Example.

The details of electrode structures in ozone generators of the samples 6 to 9 were as follows.

(Samples 6 and 7)

In the samples 6 and 7, the distances Da between the center line Lc of the internal cavity 11 and the center position Ld of the electrode pair column 24 were 2 mm and 5 mm, respectively, in the ozone generator 10 shown in FIG. 1. In the samples 6 and 7, the values obtained by subtracting the distance Da from the distance Db between the center line Lc of the internal cavity 11 and the inner wall of the housing 14 were 96 mm and 90 mm, respectively.

(Samples 8 and 9)

In the samples 8 and 9, the distances Da were 7.5 mm and 10 mm, respectively, in the ozone generator 10a of the first modification example shown in FIG. 5.

(Evaluation Result)

Figure 13:
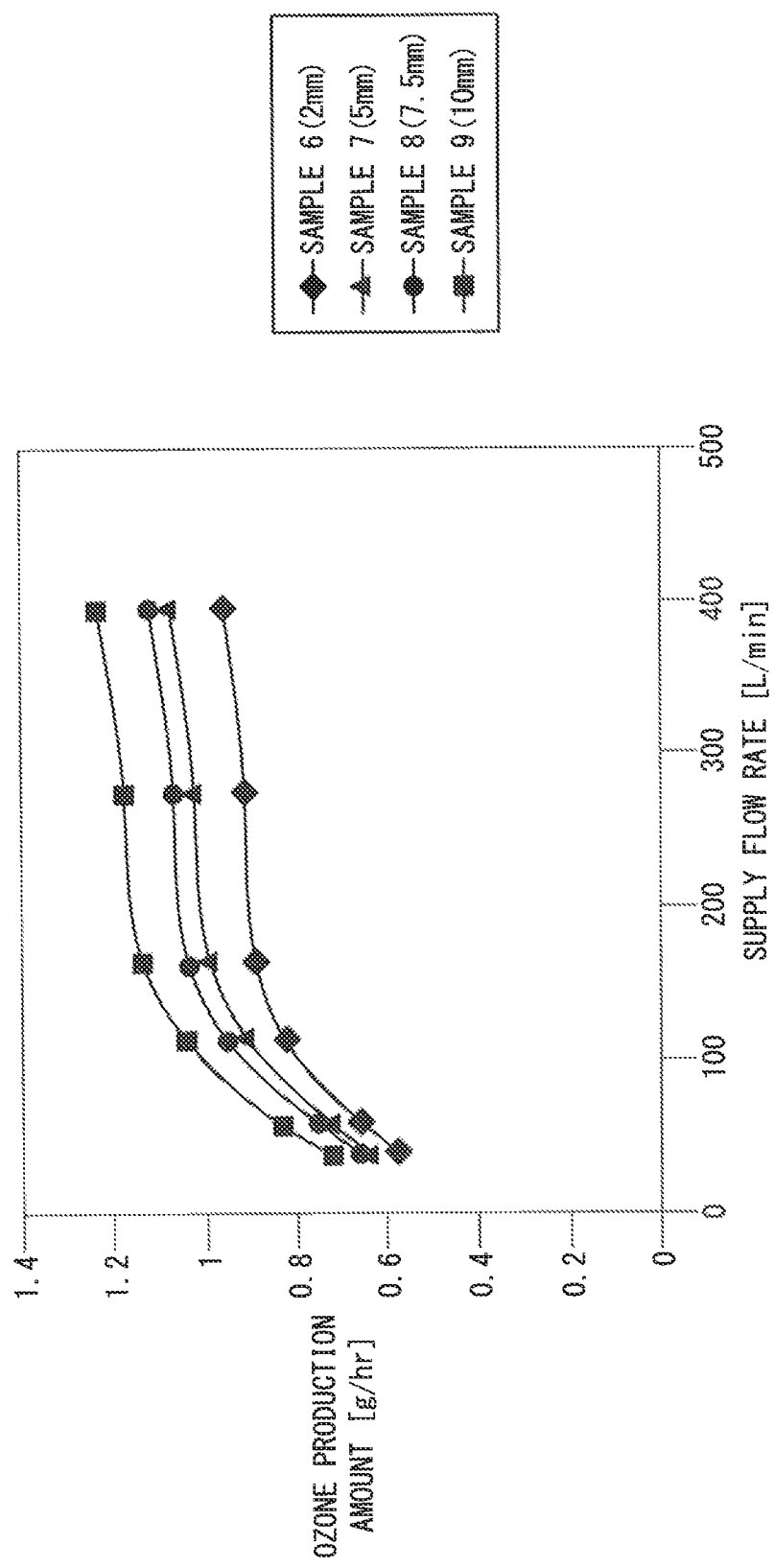
FIG. 13 is a graph showing the ozone production amount changes under various supply flow rates of a source gas in samples 6 to 9.

The evaluation results of the samples 6 to 9 are shown in FIG. 13.

As is clear from FIG. 13, as the distance Da increases, the ozone production amount tends to increase. Thus, the distance Da is preferably 5 mm or more, more preferably 7.5 mm or more, particularly preferably 10 mm or more.

It is to be understood that the ozone generator of the present invention is not limited to the above embodiments, and various changes and modifications may be made therein without departing from the scope of the invention.

What is claimed is:

1. An ozone generator comprising a housing having an internal cavity and a plurality of electrode pairs located in the internal cavity, wherein the electrode pairs each contain two electrodes arranged at a distance of a predetermined gap length, and a discharge space is formed between the two electrodes, and ozone is produced when a source gas flows at least between the two electrodes of the electrode pair and a discharge is generated between the two electrodes, and wherein of the two electrodes, one electrode is located on an upstream side of the source gas, and another electrode is located on a downstream side of the source gas such that a direction from the one electrode toward the another electrode is inclined with respect to a main flow direction of the source gas, the plurality of electrode pairs are arranged adjacent to one another in at least one of a direction perpendicular to a supply direction of the source gas and the supply direction of the source gas, and the ozone generator has a non-discharge portion on an arbitrary cross-section having a normal direction parallel to the main flow direction of the source gas in the internal cavity.

2. The ozone generator according to claim 1, wherein the plurality of electrode pairs are arranged adjacent to one another in one of the supply direction of the source as or the combination of the direction perpendicular to the supply direction of the source gas and the supply direction of the source gas.

3. The ozone generator according to claim 1, wherein in a case where a portion of the electrode pair including the discharge space is hypothetically cut by the cross-section, the ozone generator has an area ratio Ab/Aa of 20% or more, wherein Aa represents an area of the cross-section and Ab represents an area obtained by subtracting a projected area of the electrode pair and the discharge space in the cross-section from the area Aa of the cross-section.

4. The ozone generator according to claim 1, wherein in a case where a portion of the electrode pair with the discharge space is hypothetically cut by the cross-section, the ozone generator has an area ratio Ab/Aa of 80% or more, wherein Aa represents an area of the cross-section and Ab represents an area obtained by subtracting a projected area of the electrode pair and the discharge space on the cross-section from the area Aa of the cross-section.

5. The ozone generator according to claim 1, wherein 80% or more, by number, of the electrode pairs are arranged at a distance of 5 mm or more from a center line of the internal cavity.

6. The ozone generator according to claim 1, wherein all of the electrode pairs are arranged at a distance of 5 mm or more from a center line of the internal cavity.

7. The ozone generator according to claim 1, wherein 80% or more, by number, of the electrode pairs are arranged at a distance of 10 mm or more from a center line of the internal cavity.

8. The ozone generator according to claim 1, wherein all of the electrode pairs are arranged at a distance of 10 mm or more from a center line of the internal cavity.

9. The ozone generator according to claim 1, wherein an angle between the direction from the one electrode toward the another electrode and the supply direction of the source gas has an absolute value of 80° or less.

10. The ozone generator according to claim 1, wherein an angle between the direction from the one electrode toward the another electrode and the supply direction of the source gas has an absolute value of 60° or less.

11. The ozone generator according to claim 1, wherein an angle between the direction from the one electrode toward the another electrode and the supply direction of the source gas has an absolute value of 10° or more.

12. The ozone generator according to claim 1, wherein an angle between the direction from the one electrode toward the another electrode and the supply direction of the source gas has an absolute value of 30° or more.

13. The ozone generator according to claim 1, wherein the source gas is an atmospheric air having an absolute humidity of 0 to 50 $g/m^3$.

14. The ozone generator according to claim 1, wherein the gap length is at least 0.1 mm and less than 1.0 mm.

15. The ozone generator according to claim 1, wherein the electrodes each contain a tubular dielectric body having a hollow portion and a conductive body disposed in the hollow portion of the dielectric body.

\* \* \* \* \*